United States Patent
Kitamura et al.

(10) Patent No.: US 7,529,425 B2
(45) Date of Patent: *May 5, 2009

(54) DENOISING METHOD, APPARATUS, AND PROGRAM

(75) Inventors: Yoshiro Kitamura, Kanagawa-ken (JP); Wataru Ito, Kanagawa-ken (JP)

(73) Assignee: Fujifilm Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/606,091

(22) Filed: Nov. 30, 2006

(65) Prior Publication Data

US 2007/0071353 A1 Mar. 29, 2007

Related U.S. Application Data

(63) Continuation of application No. 11/052,902, filed on Feb. 9, 2005, now Pat. No. 7,356,194.

(30) Foreign Application Priority Data

Feb. 10, 2004 (JP) .............................. 2004-033291

(51) Int. Cl.
*G06K 9/40* (2006.01)
(52) U.S. Cl. .................. 382/275; 382/260; 382/274; 358/3.26; 358/3.27; 358/463
(58) Field of Classification Search ................ 382/260, 382/274, 275; 358/3.26, 3.27, 463
See application file for complete search history.

(56) References Cited

U.S. PATENT DOCUMENTS 5,991,457 A 11/1999 Ito et al.
5,995,135 A * 11/1999 Limberg ........................ 348/21
6,266,442 B1 * 7/2001 Laumeyer et al. ............ 382/190
6,476,388 B1 * 11/2002 Nakagaki et al. ............. 250/310
6,498,785 B1 * 12/2002 Derryberry et al. .......... 370/311
6,771,833 B1 * 8/2004 Edgar .......................... 382/254

FOREIGN PATENT DOCUMENTS

JP 2001-118064 A 4/2001

OTHER PUBLICATIONS

H. Kondo et al., "Colored Face Image Processing by Vector ε-Filter Removal of Wrinkles", National Meeting of the Academic Society for Electronic Information Communication, D-11-143, p. 143, 1998.

* cited by examiner

*Primary Examiner*—Yosef Kassa
(74) *Attorney, Agent, or Firm*—Birch, Stewart, Kolasch & Birch LLP

(57) ABSTRACT

A blurred image generating section generates a plurality of blurred images Sm (where m=1 to n and n≧2) different in frequency response characteristic from one another, based on an original image S0. A band-limited image generating section generates a plurality of band-limited images Tm by performing a subtraction between images of adjacent frequency bands, employing the original image S0 and each of the blurred images Sm. A noise component extraction section extracts converted images, obtained by performing nonlinear conversion on each of the band-limited images Tm, as noise components Qm contained in the different frequency bands. A noise-component elimination section subtracts from the original image S0 a value obtained by multiplying a subtraction coefficient β (which is determined according to the pixel value Y0 of the original image S0) and the sum of the noise components Qm together.

7 Claims, 5 Drawing Sheets

| 0.0025 | 0.0125 | 0.02 | 0.0125 | 0.0025 |
| --- | --- | --- | --- | --- |
| 0.0125 | 0.0625 | 0.1 | 0.0625 | 0.0125 |
| 0.02 | 0.1 | 0.16 | 0.1 | 0.02 |
| 0.0125 | 0.0625 | 0.1 | 0.0625 | 0.0125 |
| 0.0025 | 0.0125 | 0.02 | 0.0125 | 0.0025 |

FIG.7  $F_1$

| 0.1 | 0.5 | 0.8 | 0.5 | 0.1 |
| --- | --- | --- | --- | --- |

FIG.8  $F_2$

| 0.05 | 0.13 | 0.3 | 0.5 | 0.65 | 0.74 | 0.65 | 0.5 | 0.3 | 0.13 | 0.05 |
| --- | --- | --- | --- | --- | --- | --- | --- | --- | --- | --- |

DENOISING METHOD, APPARATUS, AND PROGRAM

This application is a Continuation of application Ser. No. 11/052,902 filed on Feb. 9, 2005 now U.S. Pat. No. 7,356,194, and for which priority is claimed under 35 U.S.C. §120; and this application claims priority of Application No. 2004-033291 filed in Japan on Feb. 10, 2004 under 35 U.S.C. §119; the entire contents of all are hereby incorporated by reference.

BACKGROUND OF THE INVENTION

1. Field of the Invention

The present invention relates to a denoising method and apparatus for performing the process of inhibiting noise components on a digital image acquired by imaging a subject to enhance the picture quality, and to a program for carrying out that method.

2. Description of the Related Art

Processes for the purpose of inhibiting or eliminating noise from a photographic image containing a person's face (hereinafter referred to simply as an image) have hitherto been performed. For example, low-pass filters that are usually used for eliminating noise can be applied. However, while low-pass filters can inhibit noise components from an image, they will degrade an edge portion contained in an image signal and blur the entire image.

An $\epsilon$-filter ($\epsilon$-separation nonlinear digital filter), which is designed to separate and inhibit a high-frequency noise component of low amplitude contained in an image by generating use of the fact that many of the noise components exist as signals of low amplitude in the high-frequency component of an image, is also applied to eliminate noise (H. Kondo et al., "Colored Face Image Processing by Vector $\epsilon$-Filter-Removal of Wrinkles -", Drafts in the National Meeting of the Academic Society for Electronic Information Communication, D-11-143, p. 143, 1998). Since the $\epsilon$-filter has the property of flattening only a change in the level of low amplitude contained in an image signal, an image processed by the $\epsilon$-filter preserves edges having a sharp change in the level of the amplitude and hardly loses the entire sharpness.

The $\epsilon$-filter is basically constructed to subtract from an original image signal a value obtained by applying a nonlinear function to a change of quantity in the level of the amplitude of the signal. This nonlinear function outputs a value of 0 when the amplitude of a signal is greater than a predetermined threshold value ($\epsilon_0$). That is, when the $\epsilon$-filter is employed, the output of the nonlinear function is 0 at a part in an image that has an amplitude greater than the aforementioned threshold value. In a processed image, the original signal of apart having an amplitude greater than the aforementioned threshold value is preserved. On the other hand, in a part whose amplitude is the aforementioned threshold value or less, the signal value of that processed part is a value obtained by subtracting the output of the nonlinear function (where the absolute value is greater than 0) from the original signal value. In this manner, the change in light and shade is smoothed. As a result, edges whose amplitude is high can be preserved while generating noise indistinct.

A variety of techniques have been proposed for extracting signals of different frequency bands from an image. For instance, U.S. Pat. No. 5,991,457 discloses a method for generating a plurality of blurredly masked images different in frequency response characteristics from one another, based on an original image and also generating a plurality of band-limited images respectively representing signals of different frequency bands of the original image, based on the original image and blurredly masked images, or based on the blurredly masked images. U.S. Pat. No. 5,991,457 discloses a method for efficiently generating a blurredly masked image by reducing the amount of calculation required in generating the blurredly masked image.

However, many of the noise components exist in high-frequency bands, but they exist over the entire range from high-frequency bands to low-frequency bands. The aforementioned process method utilizing the $\epsilon$-filter cannot completely eliminate noise components, because it extracts the noise components only in a single frequency band and subtracts the extracted components from the original image. In the aforementioned method for extracting noise components at a single frequency band, if the effect of eliminating noise are to be improved, filtering must be enhanced at the single frequency band, that is, the aforementioned threshold value ($\epsilon_0$) for extracting noise must be increased. However, this can easily introduce artifacts into a processed image and debase the picture quality.

SUMMARY OF THE INVENTION

In view of the circumstances mentioned above, it is an object of the present invention to provide a denoising method and an denoising apparatus that are capable of obtaining a processed image of good quality while effectively eliminating noise. Another object of the present invention is to provide a program for carrying out the denoising method.

To achieve the aforementioned objects of the present invention, the denoising method of the present invention includes four major steps: (1) a step of generating, based on a digital image acquired by imaging a subject, a plurality of band-limited images respectively representing components of a plurality of frequency bands of the digital image; (2) a step of obtaining a plurality of converted images by performing on respective pixel values of the band-limited images a nonlinear conversion process, in which an absolute value of an output value is reduced to an absolute value of an input value or less, and in which, for an input value whose absolute value is a predetermined threshold value or less, an absolute value of an output value becomes greater as an absolute value of the input value becomes greater and, for an input value whose absolute value is greater than the predetermined value, an absolute value of an output value becomes less than or equal to an absolute value of an output value corresponding to the predetermined threshold value; (3) a step of multiplying the pixel values of the converted images by a predetermined subtraction coefficient; and (4) a step of obtaining a pixel value of a processed image by subtracting the pixel values of the converted images multiplied by the predetermined subtraction coefficient, from a pixel value of the digital image.

The predetermined subtraction coefficient may employ the same coefficient for each of the pixels of the aforementioned digital image, but it is preferably determined according to a pixel value of the digital image.

A noise component often occurs at dark parts in an image that have a small luminance value. Therefore, by employing a subtraction coefficient that becomes smaller as a pixel value becomes greater (or becomes greater as a pixel value becomes smaller), the noise eliminating effect can be enhanced.

In the denoising method of the present invention, the nonlinear conversion process may be the process of generating an absolute value of an output value approximately constant for an input value whose absolute value is greater than the predetermined threshold value.

In the denoising method of the present invention, the predetermined threshold value may be determined according to a frequency band of the band-limited image to be processed.

The denoising apparatus of the present invention comprises three major parts: (1) band-limited image generating means for generating, based on a digital image acquired by imaging a subject, a plurality of band-limited images respectively representing components of a plurality of frequency bands of the digital image; (2) nonlinear conversion means for obtaining a plurality of converted images by performing on respective pixel values of the band-limited images a nonlinear conversion process, in which an absolute value of an output value is reduced to an absolute value of an input value or less, and in which, for an input value whose absolute value is a predetermined threshold value or less, an absolute value of an output value becomes greater as an absolute value of the input value becomes greater and, for an input value whose absolute value is greater than the predetermined value, an absolute value of an output value becomes less than or equal to an absolute value of an output value corresponding to the predetermined threshold value; and (3) frequency inhibition means for multiplying the pixel values of the converted images by a predetermined subtraction coefficient, and for obtaining a pixel value of a processed image by subtracting the pixel values of the converted images multiplied by the predetermined subtraction coefficient, from a pixel value of the digital image.

In the denoising apparatus of the present invention, the aforementioned subtraction coefficient may be determined according to a pixel value of the digital image.

In the denoising apparatus of the present invention, the aforementioned nonlinear conversion means may cause an absolute value of an output value to be approximately constant for an input value whose absolute value is greater than the predetermined threshold value.

In the denoising apparatus of the present invention, the aforementioned threshold value may be determined according to a frequency band of the band-limited image to be processed.

The program of the present invention is a program for causing a computer to carry out the denoising method of the present invention.

Note that the program of the present invention may be provided being recorded on a computer readable medium. Those who are skilled in the art would know that computer readable media are not limited to any specific type of device, and include, but are not limited to: floppy disks, CD's, RAM's, ROM's, hard disks, magnetic tapes, and internet downloads, in which computer instructions can be stored and/or transmitted. Transmission of the computer instructions through a network or through wireless transmission means is also within the scope of this invention. Additionally, computer instructions include, but are not limited to: source, object and executable code, and can be in any language, including higher level languages, assembly language, and machine language.

The denoising method, apparatus, and program of the present invention generate, based on a digital image acquired by imaging a subject, a plurality of band-limited images respectively representing components of a plurality of frequency bands of the digital image and then obtain a plurality of converted images by performing a nonlinear conversion process on the band-limited images. The nonlinear conversion process is the process of reducing an absolute value of an output value to an absolute value of an input value or less. At the same time, for an input value whose absolute value is a predetermined threshold value or less, an absolute value of an output value becomes greater as an absolute value of the input value becomes greater. For an input value whose absolute value is greater than the predetermined value, an absolute value of an output value becomes less than or equal to an absolute value of an output value corresponding to the predetermined threshold value. The converted image obtained by this nonlinear conversion process represents a noise component of low amplitude, contained in a frequency band to which the converted image corresponds. The present invention obtains the pixel value of a processed image by multiplying the pixel values of the converted images by a predetermined subtraction coefficient, and then subtracting the obtained value from the pixel value of the original digital image. In this manner, the noise components in the different frequency bands of the digital image can be effectively eliminated from the digital image.

In the conventional technique for extracting noise components contained at a single frequency band, the nonlinear process at the single frequency band must be enhanced (i.e., a threshold value for extracting noise components must be increased) in order to raise the effect. This can easily introduce artifacts into a processed image and degrade the picture quality. In the present invention, noise components are eliminated in a plurality of different frequency bands. Therefore, a good denoising effect can be obtained without considerably enhancing the nonlinear process at each frequency band. As a result, artifacts can be prevented and a processed image of high picture quality can be obtained.

BRIEF DESCRIPTION OF THE DRAWINGS

The present invention will be described in further detail with reference to the accompanying drawings wherein:

FIG. 7 is a diagram showing an example of a filter employed when a filtered image is interpolated by the interpolation means of the blurred image generating means shown in FIG. 2;

FIG. 8 is a diagram showing an example of another filter employed when another filtered image is interpolated by the interpolation means of the blurred image generating means shown in FIG. 2;

DESCRIPTION OF THE PREFERRED EMBODIMENTS

Figure 1:
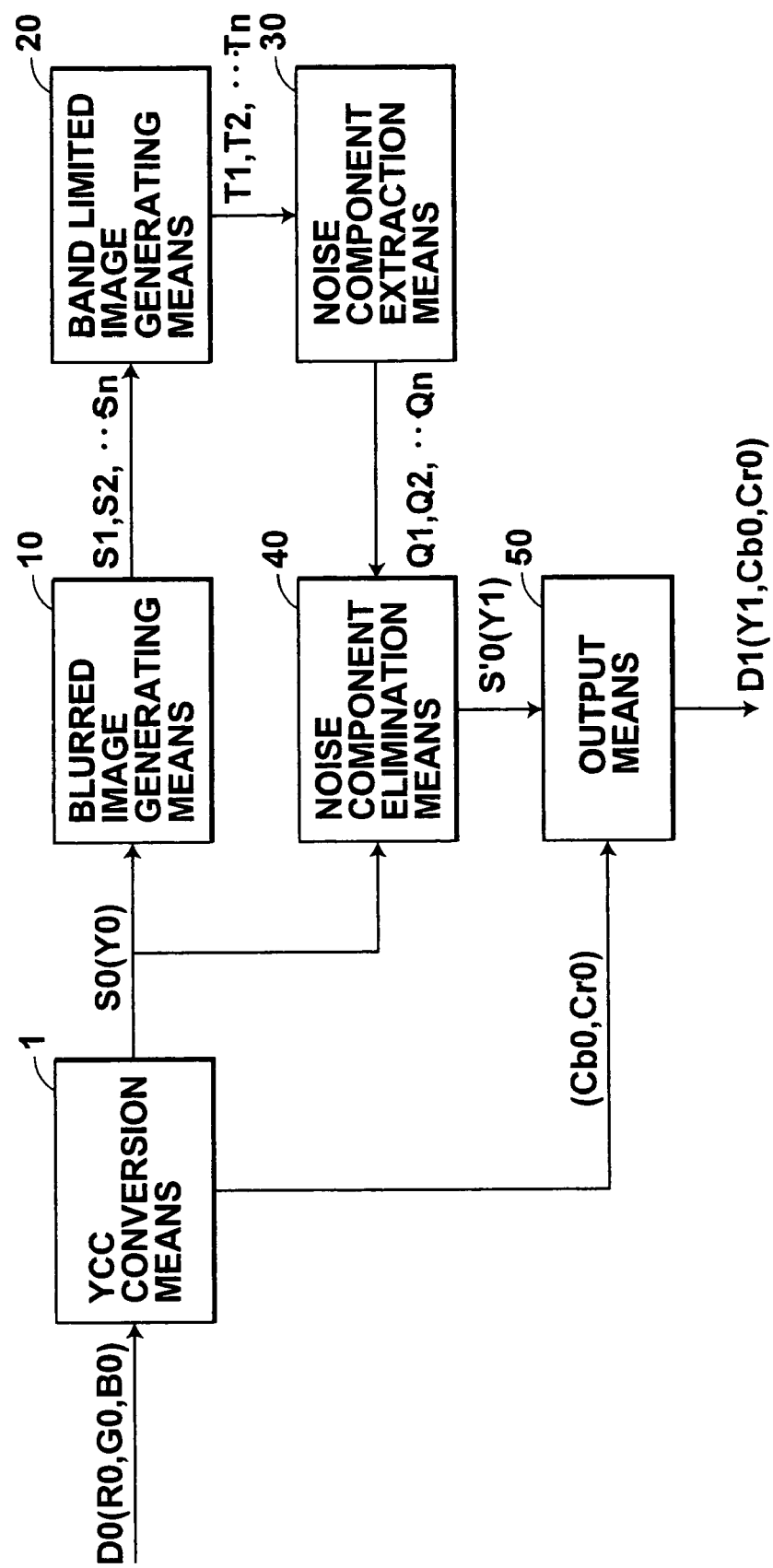
FIG. 1 is a block diagram showing a denoising apparatus constructed in accordance with a preferred embodiment of the present invention.

Referring initially to FIG. 1, there is shown a denoising apparatus constructed in accordance with a preferred embodiment of the present invention. The denoising apparatus of the preferred embodiment is used to perform a denoising process on an input digital image and is realized by carrying out a denoising program read in an auxiliary storage by a computer (e.g., a personal computer, etc.). Note that the denoising program can be stored in an information storage medium such as CD-ROM, etc., or can be installed in a computer through a network such as the Internet, etc.

Also, because image data represents an image, a description will hereinafter be given without discriminating between them.

As shown in FIG. 1, the denoising apparatus of the preferred embodiment includes four parts: (1) blurred image generating means 10 for generating a plurality of blurred images S1, S2, . . . , and Sn (where n is an integer≧2) different in frequency response characteristic from one another, based on an original image S0; (2) band-limited image generating means 20 for generating a plurality of band-limited images T1, T2, . . . , and Tn by employing the original image S0 and blurred images S1, S2, . . . , and Sn; (3) noise-component extraction means 30 for extracting noise components Q1, Q2, . . . , and Qn contained in the frequency bands to which the band-limited images T1, T2, . . . , and Tn correspond, by performing a nonlinear conversion process on each of the band-limited images T1, T2, . . . , and Tn; and (4) noise-component elimination means 40 for obtaining a denoised image S' (Y1) by eliminating the noise components Q1, Q2, . . . , and Qn from the original image S0. Since these means perform processing in a luminance space, the denoising apparatus of the preferred embodiment further includes two parts: (1) YCC conversion means 1 for obtaining the luminance component Y0 (which forms the aforementioned original image S0) and two color difference components Cb0 and Cr0 of an input image D0 (R0, G0, and B0) by performing YCC conversion on the input image D0; and (2) output means 50 for outputting as a processed image D1 (Y1, Cb0, and Cr0) an image comprising the pixel value Y1 of the denoised image S'0, obtained by the noise-component elimination means 40, and the two color difference components Cb0 and Cr0, obtained by the YCC conversion means 1. Each of the parts of the preferred embodiment will hereinafter be described in further detail.

The YCC (luminance value Y and two color difference values Cb and Cr) conversion means 1 converts the R, G, and B values of image data D0 into a luminance value Y and two color difference values Cb and Cr according to the following Eq. (1):

$$Y = 0.2990 \times R + 0.5870 \times G + 0.1140 \times B$$

$$Cb = -0.1687 \times R - 0.3313 \times G + 0.5000 \times B + 128$$

$$Cr = 0.5000 \times R - 0.4187 \times G - 0.0813 \times B + 128 \quad (1)$$

Figures 2, 3:
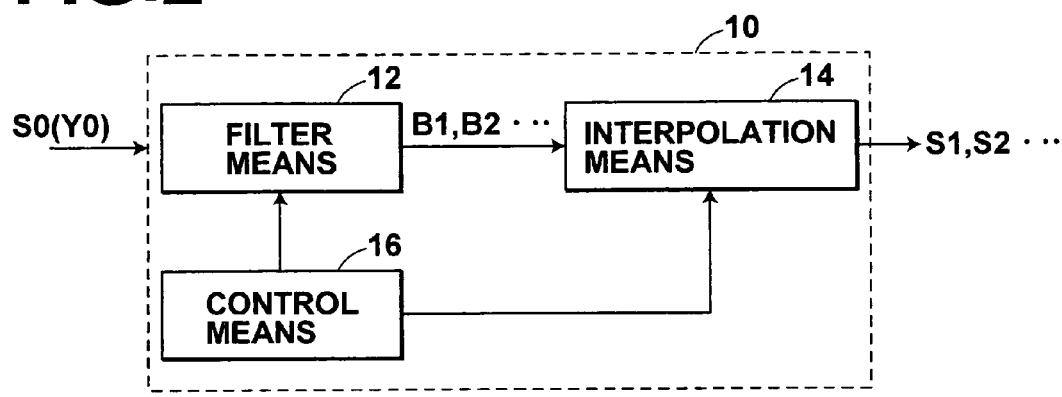
FIG. 2 is a block diagram showing the blurred-image generating means of the denoising apparatus shown in FIG. 1.
FIG. 3 is a diagram showing an example of a one-dimensional filter employed by the filter means of the blurred-image generating means.

The blurred-image generating means 10 generates a plurality of blurred images employing the luminance value Y0 obtained by the YCC conversion means 1. The blurred-image generating means 10 is constructed as shown in FIG. 2. In the denoising apparatus of the preferred embodiment, the blurred-image generating means 10 generates blurred images by the methods disclosed in U.S. Pat. No. 5,991,457 As shown in FIG. 2, the blurred-image generating means 10 comprises three major parts: (1) filter means 12 for obtaining filtered images B1, B2, . . . , and Bn by performing a filter process; (2) interpolation means 14 for performing an interpolation process on each of the filtered images B1, B2, . . . , and Bn; and (3) control means 16 for controlling the filter means 12 and interpolation means 14. The filter means 12 performs a filter process by employing a low-pass filter. This low-pass filter can employ a filter F in the form of a 5×1 grid approximately corresponding to one-dimensional Gaussian distribution. This filter F can be obtained when σ=1 in the following Eq. (2):

$$f_{(t)} = e^{-\frac{t^2}{2\sigma^2}} \quad (2)$$

The filter means 12 performs a filter process on the entirety of a target image that is a processing object by performing the filter process on the target image in the x direction and y direction of a pixel with the aforementioned filter F.

Figure 4:
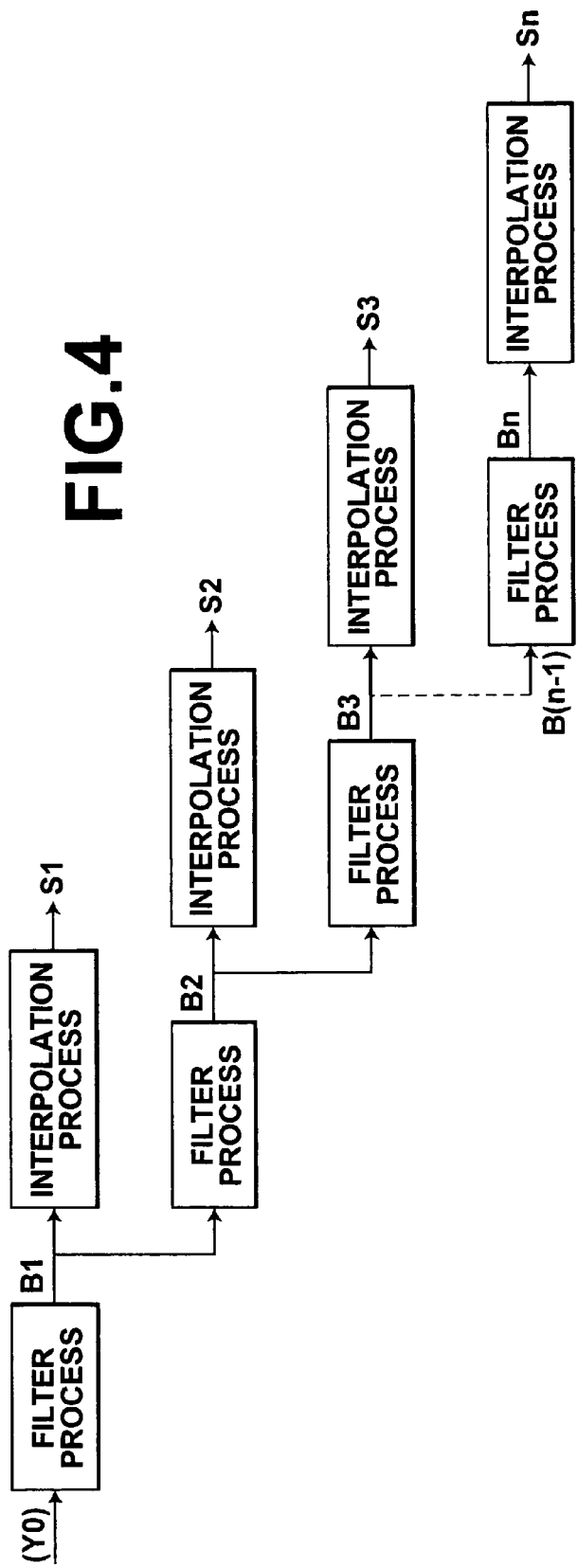
FIG. 4 is a diagram showing the processes that are performed in the blurred image generating means shown in FIG. 2.
Figures 5, 6:
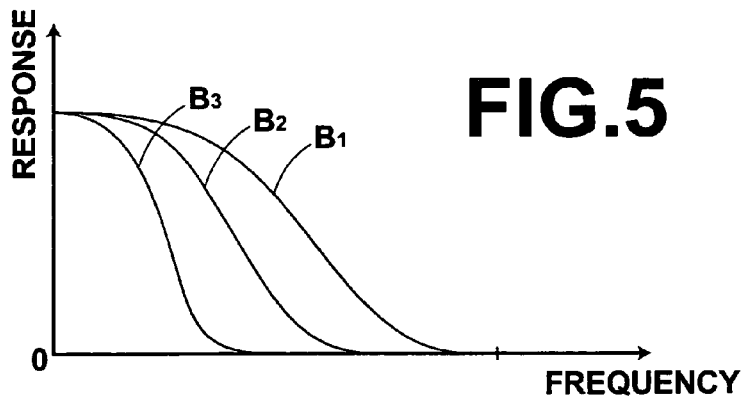
FIG. 5 is a diagram showing the frequency characteristic of each of the filtered images made by the filter means of the blurred image generating means shown in FIG. 2.
FIG. 6 is a diagram showing an example of a two-dimensional filter employed by the filter means of the blurred image generating means shown in FIG. 2.

FIG. 4 shows how the control means 16 of the blurred image generating means 10 causes the filter means 12 and interpolation means 14 to process an original image S0(Y0). As shown in the figure, the filter means 12 first performs a filter process on every other pixel of the original image S0(Y0) with the filter F shown in FIG. 3. With this filter process, a filtered image B1(Y1) is obtained. The size of the filtered image B1 is ¼ of the size of the original image S0 in the x direction and ½ of the size of the original image S0 in the y direction. Then, the filter means 12 performs the filter process on every other pixel of the filtered image B1 (Y1) with the filter F and obtains a filtered image B2 (Y2). The filter means 12 repeats the filter process employing the filter F and obtains n filtered images Bk (where k=1 to n). The size of the filtered image Bk is reduced to $\frac{1}{2^{2k}}$ of the size of the original image S0. FIG. 5 shows the frequency characteristic of each of the filtered images Bk obtained by the filter means 12 when n=3, as an example. As shown in the figure, the filtered images Bk indicate that higher-frequency components of the original image S0 are eliminated as the value of k becomes greater.

In the denoising apparatus of the preferred embodiment, while the filter means 12 performs the filter process in the x direction and y direction of an image with the filter F shown in FIG. 3, the filter means 12 may perform the filter process on the original image S0 and filtered image Bk at a time with a 5×5 two-dimensional filter such as that shown in FIG. 6.

The interpolation means 14 causes the size of each of the filtered images Bk to be the same as that of the original image S0 by performing an interpolation process on each of the filtered images Bk obtained by the filter means 12. The interpolation process can be performed by various methods such as a B-spline method, but since the filter means 12 in the preferred embodiment employs the filter F based on a Gaussian signal as a low-pass filter, the interpolation means 14 employs a Gaussian signal as an interpolation coefficient for performing interpolation calculation in the interpolation process. This interpolation coefficient approximates to the following Eq. (3) when $\sigma = 2^{k-1}$.

$$I_{(t)} = 2 \times \sigma \times e^{-\frac{t^2}{2\sigma^2}} \qquad (3)$$

In interpolating the filtered image B1, a equals 1 because k=1. When σ equals 1 in the aforementioned Eq. (3), a filter for interpolation is a 5×1 one-dimensional filter F1 such as the one shown in FIG. 7. The interpolation means 14 first enlarges the filtered image B1 to the same size as the original image S0 by interpolating a pixel having a value of 0 (hereinafter referred to as a 0-pixel) into the filtered image B1 at intervals of one pixel. The interpolation means 14 then obtains a blurred image S1 by performing the filter process on the enlarged image with the filter F1 shown in FIG. 7. This blurred image S1 has a number of pixels that corresponds to the number of pixels in the original image S0. That is, the blurred image S1 has the same size as the original image S0.

The filter F1 shown in FIG. 7 is a 5×1 filter, but before the filter F1 is used, a single 0-pixel is interpolated into the filtered image B1 at intervals of one pixel. Therefore, the interpolation process by the interpolation means 14 is practically equivalent to the filter process performed by two kinds of filters: a 2×1 filter (0.5 and 0.5) and a 3×1 filter (0.1, 0.8, and 0.1).

In performing interpolation on the filtered image B2 by the interpolation means 14, a equals 2 because k=2. In the aforementioned Eq. (3), a filter corresponding to σ=2 is a 11×1 one-dimensional filter F2 shown in FIG. 8. The interpolation means 14 first enlarges the filtered image B2 to the same size as the original image S0 by interpolating three 0-pixels into the filtered image B2 at intervals of one pixel. The interpolation means 14 then obtains a blurred image S2 by performing the filter process on the enlarged image with the filter F2 shown in FIG. 8. The blurred image S2 has a number of pixels that corresponds to the number of pixels in the original image S0. That is, the blurred image S2 has the same size as the original image S0.

Similarly, the filter F2 shown in FIG. 8 is a 11×1 filter, but before the filter F2 is applied, three 0-pixels are interpolated into the filtered image B2 at intervals of one pixel. Therefore, the interpolation process by the interpolation means 14 is practically equivalent to the filter process performed by four kinds of filters: a 2×1 filter (0.5 and 0.5) and 3×1 filters (0.3, 0.65, and 0.05), (0.3, 0.74, and 0.13), and (0.05, 0.65, and 0.3).

Thus, the interpolation means 14 enlarges each of the filtered images Bk to the same size as the original image S0 by interpolating $(2^k-1)$ 0-pixels into each of the filtered images B2 at intervals of one pixel. And the interpolation means 14 obtains blurred images Sk by performing the filter process on each of the filtered images Bk, where 0-pixels are interpolated, with the filter having a length of $(3 \times 2^k - 1)$ made based on the aforementioned Eq. (3).

Figure 9:
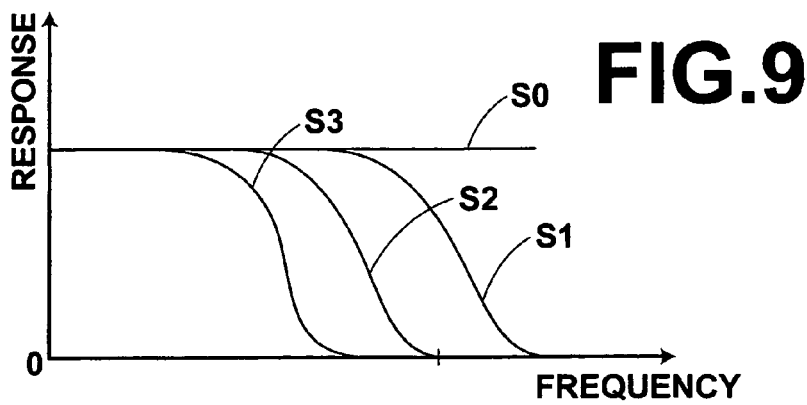
FIG. 9 is a diagram showing the frequency characteristic of each of the blurred images made by the blurred image generating means shown in FIG. 2.

FIG. 9 shows the frequency characteristic of each of the blurred images Sk obtained by the blurred image generating means 10 when n=3, as an example. As shown in the figure, the blurred images Sk indicate that higher-frequency components of the original image S0 are eliminated as the value of k becomes greater.

The band-limited image generating means 20 generates band-limited images T1, T2, . . . , and Tn respectively representing a plurality of frequency bands of the original image S0 according to the following Eq. (4), using the blurred images S1, S2, . . . , and Sn obtained by the blurred image generating means 10.

$$Tm = S(m-1) - Sm \qquad (4)$$

in which m=1≦integer≦n.

Figure 10:
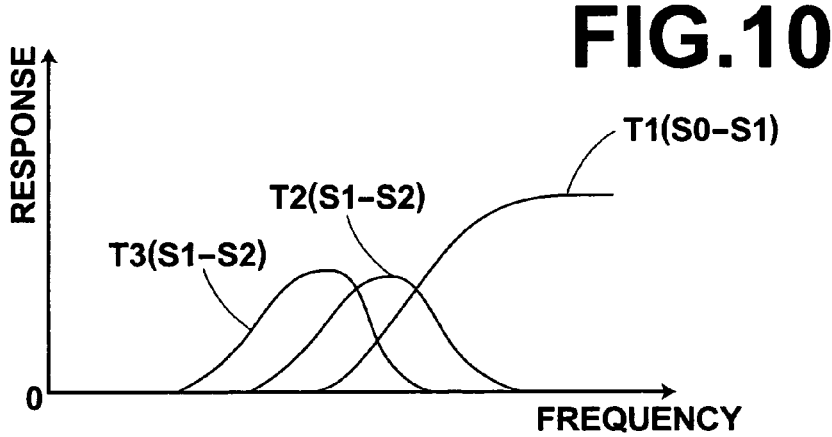
FIG. 10 is a diagram showing the frequency characteristic of each of the band-limited images made by the band-limited image generating means of the denoising apparatus shown in FIG. 1.

FIG. 10 shows the frequency characteristic of each of the band-limited images Tm obtained by the band-limited image generating means 20 when n=3, as an example. As shown in the figure, the band-limited images Tm represent the components in lower-frequency bands of the original image S0, as the value of m becomes greater.

The noise component extraction means 30 extracts noise components Q1, Q2, . . . , and Qn contained in the frequency bands to which the band-limited images Tm (where m=1 to n) obtained by the band-limited image generating means 20 correspond, by performing nonlinear conversion on each of the band-limited images Tm. This nonlinear conversion is the process of reducing an output value to an input value or less. At the same time, for an input value that is a predetermined threshold value or less, an output value becomes greater as the input value becomes greater. On the other hand, for an input value that is greater than the predetermined threshold value, an output value becomes less than or equal to an output value corresponding to the predetermined threshold value. In the preferred embodiment of the present invention, the nonlinear conversion is performed by a function f such as that shown in FIG. 11. In the figure, a broken line indicates output value=input value. That is, a function represented by the broken line has a gradient of 1. As shown in the figure, the function f for the nonlinear conversion employed in the noise component extraction means 30 of the preferred embodiment has a gradient of 1 when the absolute value of an input value is a first threshold value Th1 or less and also has a gradient of less than 1 when the absolute value of an input value is between the first threshold value Th1 and a second threshold value Th2. The function f further outputs a constant value M whose absolute value is less than the absolute value of an input value, when the absolute value of the input value is greater than the second threshold value Th2. Note that the function f may employ the same function for each of the band-limited images, but a different function may also be employed for each of the band-limited images.

Figure 11:
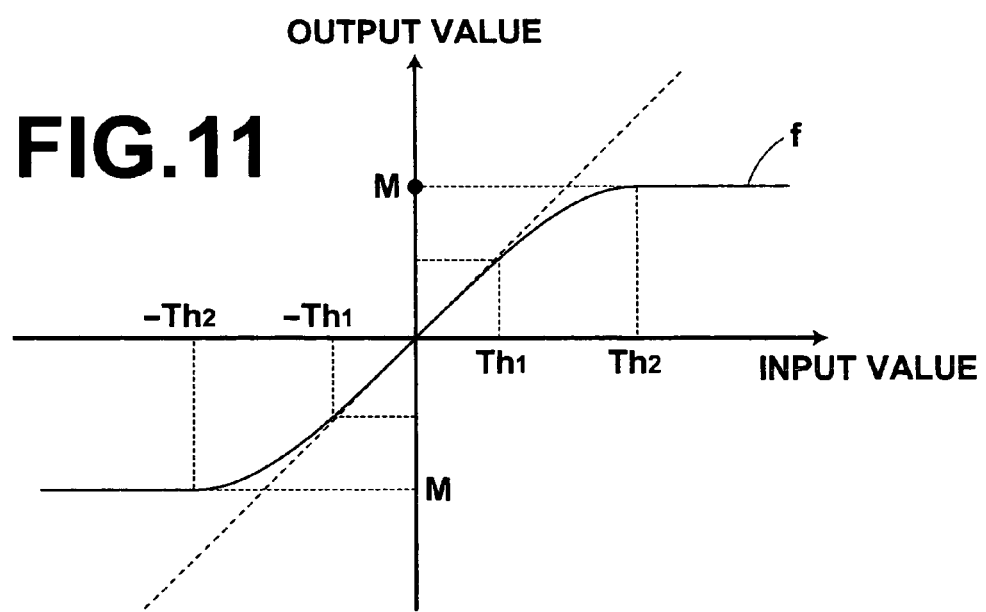
FIG. 11 is a diagram showing an example of a function employed by the noise component extraction means of the denoising apparatus shown in FIG. 1.

The noise component extraction means 30 uses the luminance value of each of the band-limited images as an input value, then performs nonlinear conversion on each of the band-limited images by employing the function f shown in FIG. 11, and extracts a noise component Qm (where m=1 to n), contained in the frequency band to which each of the band-limited images corresponds, which comprises the luminance value of an output value.

The noise component elimination means 40 obtains a denoised image S'0(Y1) by multiplying each of the noise components Qm, extracted by the noise component extraction means 30, by a subtraction coefficient β and then subtracting the noise components Qm multiplied by the subtraction coefficient β from the original image S0(Y0). The following Eq. (5) shows the process that is performed by the noise component elimination means 40.

$$S'0 = S0 - \beta(S0)\sum_{m=1}^{n} Qm \qquad (5)$$

in which n=integer≧2

S0=original image

Qm (where m=1 to n)=noise component
β=subtraction coefficient.

The subtraction coefficient β is β(S0). That is, it is determined in dependence on the luminance value Y0 of each pixel of the original image S0. More specifically, as the luminance value Y0 of a pixel becomes greater, the subtraction coefficient β for calculating the pixel value Y1 of that pixel becomes smaller.

The output means 50 outputs as a processed image D1 an image (Y1, Cr0, and Cb0) comprising the luminance value Y1 obtained by the noise component elimination means 40 and the two color difference values Cb0 and Cr0 of the original image D0 obtained by the YCC conversion means 1.

Thus, the denoising apparatus of the preferred embodiment generates a plurality of band-limited images Tm (where m=1 to n and n≧2) respectively representing the components in different frequency bands of the original images S0(Y0), and then performs a nonlinear conversion process on these band-limited images to obtain a plurality of converted images (noise components). And the pixel value (luminance value Y1) of a processed image is obtained by multiplying the pixel values of the converted images by the subtraction coefficient β determined according to the luminance value of the original image S0, and then subtracting the obtained value from the pixel value (luminance value Y0) of the original image S0. In this manner, the noise components in the different frequency bands of a photographic image can be effectively eliminated. In addition, noise components are eliminated in a plurality of different frequency bands. This can prevent artifacts caused by the prior art in which the elimination of noise components in only a single frequency band is performed. Thus, a processed image of high picture quality can be obtained.

While the present invention has been described with reference to the preferred embodiment thereof, the denoising method, apparatus and program of the present invention are not to be limited to the details given herein, but may be modified within the scope of the invention hereinafter claimed.

For example, in the denoising apparatus of the preferred embodiment, the band-limited image generating means 20 obtains band-limited images according to the aforementioned Eq. (4), employing the original image S0 and blurred images Sk (where k=1 to n and n≧2). Also, the processing that are performed in the band-limited image generating means 20, noise component extraction means 30, and noise component elimination means 40 can be represented by the following Eq. (6). However, the processing in the band-limited image generating means 20, noise component extraction means 30, and noise component elimination means 40 may be performed by the following Eq. (7), (8), or (9). That is, like the processing in the denoising apparatus of the preferred embodiment represented by the aforementioned Eq. (6), band-limited images may be obtained by performing a subtraction between images of frequency bands adjacent to each other (where the original image S0 is assumed to be adjacent in frequency band to the blurred image S1), employing the original image and blurred images. However, as indicated by Eq. (7), band-limited images may be obtained by a subtraction between each of all blurred images and the original image. In addition, as indicated by Eq. (8), band-limited images may be obtained by performing a subtraction between blurred images in adjacent frequency bands, without employing the original image. Furthermore, as indicated by Eq. (9), band-limited images may be obtained by performing a subtraction between the blurred image S1 and each of the remaining blurred images, without employing the original image.

$$S'0 = S0 - \beta(S0)\sum_{m=1}^{n} f_m(S(m-1) - Sm) \quad (6)$$

in which
n=integer≧2
S0=original image
Sm (where m=1 to n)=blurred image
$f_m$=nonlinear conversion function
β=subtraction coefficient.

$$S'0 = S0 - \beta(S0)\sum_{m=1}^{n} \frac{1}{n} \cdot f_m(S0 - Sm) \quad (7)$$

in which
n=integer≧2
S0=original image
Sm (where m=1 to n)=blurred image
$f_m$=nonlinear conversion function
β=subtraction coefficient.

$$S'0 = S0 - \beta(S0)\sum_{m=1}^{n-1} f_m(Sm - S(m+1)) \quad (8)$$

in which
n=integer≧3
S0=original image
Sm (where m=1 to n)=blurred image
$f_m$=nonlinear conversion function
β=subtraction coefficient.

$$S'0 = S0 - \beta(S0)\sum_{m=2}^{n} \frac{1}{n-1} \cdot f_m(S1 - Sm) \quad (9)$$

in which
n=integer≧3
S0=original image
Sm (where m=1 to n)=blurred image
$f_m$=nonlinear conversion function
β=subtraction coefficient.

The method for generating band-limited images is not limited to the method of generating blurred images from an original image and then generating band-limited images by employing the original image and/or blurred images, like the methods represented by the aforementioned Eqs. (4) and (6) to (9). The present invention can employ any method, as long as it can generate images representing the components in different frequency bands of an original image.

In the preferred embodiment, the entire image is processed, the denoising process may be performed only on a portion of the image. In this manner, the amount of calculation can be reduced.

Particularly, the second threshold value Th2 employed in performing nonlinear conversion on band-limited images may be varied according to information about a subject contained in a digital image. Note that the information about a subject may be acquired by a recognition process or by referring to tag information, or that information may be manually input by an operator.

Parameters, such as threshold values for the subtraction efficient and nonlinear conversion, may be varied according to the magnitude of the denoising effect desired by users as well as the information about a subject.

The above-described parameters may also be varied according to applications of photographic images such as images for photographing, a marriage ceremony, an automatic photographing machine, etc.

In the denoising apparatus of the preferred embodiment, the denoising process is carried out only in a luminance space. However, noise components in colors may be eliminated by processing red, green, and blue components.

What is claimed is:

1. A denoising method comprising:
   at least one processor for implementing the following steps:
   generating, based on a digital image acquired by imaging a subject, a plurality of band-limited images respectively representing components of a plurality of frequency bands of said digital image;
   obtaining a plurality of converted images by performing on respective pixel values of said band-limited images a nonlinear conversion process, in which an absolute value of an output value is reduced to an absolute value of an input value or less, and in which, for an input value whose absolute value is a predetermined threshold value or less, an absolute value of an output value becomes greater as an absolute value of said input value becomes greater and, for an input value whose absolute value is greater than said predetermined value, an absolute value of an output value becomes less than or equal to an absolute value of an output value corresponding to said predetermined threshold value;
   multiplying the pixel values of said converted images by a predetermined subtraction coefficient; and
   obtaining a pixel value of a processed image by subtracting the pixel values of said converted images multiplied by said predetermined subtraction coefficient, from a pixel value of said digital image,
   wherein the predetermined subtraction coefficient is determined according to a pixel value of said digital image so that the subtraction coefficient becomes smaller as the pixel value becomes greater.

2. The denoising method as set forth in claim 1, wherein said nonlinear conversion process is a process of generating an absolute value of an output value approximately constant for an input value whose absolute value is greater than said predetermined threshold value.

3. The denoising method as set forth in claim 1, wherein said predetermined threshold value is determined according to a frequency band of said band-limited image to be processed.

4. A denoising apparatus comprising:
   band-limited image generating means for generating, based on a digital image acquired by imaging a subject, a plurality of band-limited images respectively representing components of a plurality of frequency bands of said digital image;
   nonlinear conversion means for obtaining a plurality of converted images by performing on respective pixel values of said band-limited images a nonlinear conversion process, in which an absolute value of an output value is reduced to an absolute value of an input value or less, and in which, for an input value whose absolute value is a predetermined threshold value or less, an absolute value of an output value becomes greater as an absolute value of said input value becomes greater and, for an input value whose absolute value is greater than said predetermined value, an absolute value of an output value becomes less than or equal to an absolute value of an output value corresponding to said predetermined threshold value; and
   frequency inhibition means for multiplying the pixel values of said converted images by a predetermined subtraction coefficient, and for obtaining a pixel value of a processed image by subtracting the pixel values of said converted images multiplied by said predetermined subtraction coefficient, from a pixel value of said digital image,
   wherein the predetermined subtraction coefficient is determined according to a pixel value of said digital image so that the subtraction coefficient becomes smaller as the pixel value becomes greater.

5. The denoising apparatus as set forth in claim 4, wherein said nonlinear conversion means causes an absolute value of an output value to be approximately constant for an input value whose absolute value is greater than said predetermined threshold value.

6. The denoising apparatus as set forth in claim 4, wherein said predetermined threshold value is determined according to a frequency band of said band-limited image to be processed.

7. A program embodied on a computer readable medium for causing a computer to carry out:
   a process of generating, based on a digital image acquired by imaging a subject, a plurality of band-limited images respectively representing components of a plurality of frequency bands of said digital image;
   a process of obtaining a plurality of converted images by performing on respective pixel values of said band-limited images a nonlinear conversion process in which an absolute value of an output value is reduced to an absolute value of an input value or less, and in which, for an input value whose absolute value is a predetermined threshold value or less, an absolute value of an output value becomes greater as an absolute value of said input value becomes greater and, for an input value whose absolute value is greater than said predetermined value, an absolute value of an output value becomes less than or equal to an absolute value of an output value corresponding to said predetermined threshold value;
   a process of multiplying the pixel values of said converted images by a predetermined subtraction coefficient; and
   a process of obtaining a pixel value of a processed image by subtracting the pixel values of said converted images multiplied by said predetermined subtraction coefficient, from a pixel value of said digital image,
   wherein the predetermined subtraction coefficient is determined according to a pixel value of said digital image so that the subtraction coefficient becomes smaller as the pixel value becomes greater.

* * * * *